United States Patent [19]

Nakaoki et al.

[11] 4,427,882
[45] Jan. 24, 1984

[54] DIGITAL MEASURING DEVICE

[75] Inventors: Touru Nakaoki; Hiroshi Uno, both of Tokyo, Japan

[73] Assignee: Mutoh Industry Ltd., Tokyo, Japan

[21] Appl. No.: 296,060

[22] Filed: Aug. 25, 1981

[30] Foreign Application Priority Data

Oct. 24, 1980 [JP] Japan .................. 55-149048

[51] Int. Cl.³ .............................. G01D 5/34
[52] U.S. Cl. ................. 250/231 SE; 356/356; 250/237 G
[58] Field of Search .......... 340/347 P; 33/1 PT, 33/DIG. 21; 73/1 J; 250/231 SE, 237 G; 356/356, 4; 364/560

[56] References Cited

U.S. PATENT DOCUMENTS

| | | | |
|---|---|---|---|
| 4,113,381 | 9/1978 | Epstein | 250/231 SE |
| 4,117,320 | 9/1978 | Tomlinson et al. | 250/237 G |
| 4,312,220 | 1/1982 | Borgersen et al. | 250/231 SE |
| 4,365,301 | 12/1982 | Arnold et al. | 364/560 |

FOREIGN PATENT DOCUMENTS 1200521 7/1970 United Kingdom .

Primary Examiner—David C. Nelms
Assistant Examiner—Jere J. Brophy
Attorney, Agent, or Firm—Wenderoth, Lind & Ponack

[57] ABSTRACT

A digital measuring device for a machine tool in which a transfer member is fed in a predetermined direction by the manual rotation of a lead screw; the improved digital measuring device includes: a pulse generating unit for converting a rotational motion of the lead screw to a pulse signal having a direction component, a microcomputer for storing accurate transfer data of a feed system of the machine tool for each address signal based on the pulse signal, and a display unit connected to an output side of the microcomputer, whereby the address signal is inputted to the microcomputer on the basis of the output pulse of the pulse generating unit, and the previously measured accurate transfer data of the feed system of the machine tool is called out from the microcomputer, and the transfer data is displayed on the display unit.

3 Claims, 21 Drawing Figures

FIG. 1
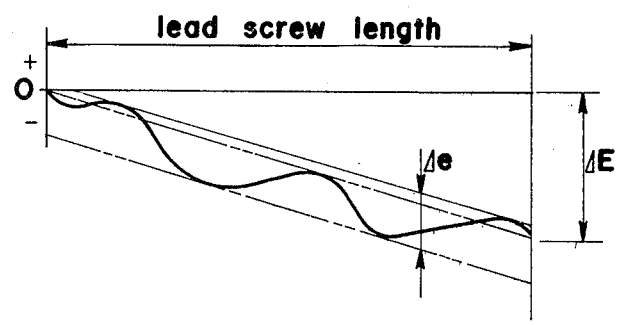
FIG. 2A
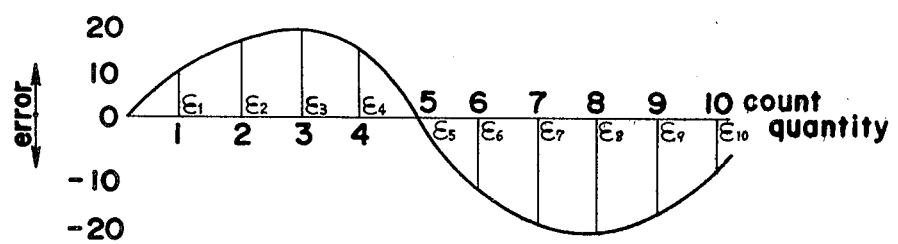
FIG. 2B
| Address | 1 | 2 | 3 | 4 | 5 | 6 | 7 | 8 | 9 | 10 | ---- | n |
|---|---|---|---|---|---|---|---|---|---|---|---|---|
| error quantity | $\varepsilon_1$ | $\varepsilon_2$ | $\varepsilon_3$ | $\varepsilon_4$ | $\varepsilon_5$ | $-\varepsilon_6$ | $-\varepsilon_7$ | $-\varepsilon_8$ | $-\varepsilon_9$ | $-\varepsilon_{10}$ | ---- | $\varepsilon_n$ |

DIGITAL MEASURING DEVICE

BACKGROUND AND SUMMARY OF THE INVENTION

This invention relates to a digital measuring device, and more particularly to a digital measuring device for installation on a machine tool and the like.

Digital measuring devices for displaying a quantity of rotation (the rotational frequency) of a lead screw of the machine tool are disclosed by U.S. Pat. No. 4,117,320 and British Pat. No. 1,499,504. The feed system of the machine tool is generally constructed in such way that a thread is formed on the lead screw and a nut is screwed to the thread of the lead screw and the nut is connected to the cross slide. Another general construction of the feed system of the machine tool is such that the gear is fixed to the lead screw, and the rack is engaged with this gear, and the rack is connected to the cross slide.

In the foregoing construction, when the lead screw is rotated, the cross slide is shifted in the rectilinear direction. Accordingly, when the digital measuring device is mounted on the lead screw, the rotational motion of the lead screw is converted to the pulse signal in an A-D mode, and the pulse signal is counted by a reversible counter, and the quantity of transfer (the transfer distance) of the cross slide is digitally displayed. However, as is well known, the lead screw forming the feed system of the machine tool has a thread accuracy error $\Delta e$ and a cumulative lead error $\Delta E$ as shown in FIG. 1. Of these errors, the cumulative lead error $\Delta E$ can be mechanically corrected, but with respect to the screw accuracy error $\Delta e$, the mechanical correction thereof is not possible. Accordingly, in case the encoder is used for converting the rotational motion of the lead screw to the pulse signal used to count and display the feed quantity of the cross slide by the rotation of the lead screw, there is a drawback in that the error occurs in the display value of the feed quantity of the cross slide by the screw accuracy error $\Delta e$.

Also, in case the feed quantity of the cross slide is counted and displayed by rotating the lead screw connected to the gear, an error similar to the abovenoted error occurs due to the pitch accuracy error of the gear.

Under these circumstances, a primary object of this invention is to display the accurate transfer quantity of the cross slide on the display unit on the basis of the data by utilizing the output pulse on the encoder as the address signal and previously inputting the accurate transfer quantity measuring data corresponding to the address signal to the memory of the microcomputer and then subsequently inputting the output pulses of the encoder to the microcomputer and outputting the data therefrom corresponding to the encoder pulses.

The drawings show the preferred embodiments of this invention. However, it should be noted that various modifications can be made from the constructions disclosed herein, and should not be construed that the drawings and the descriptions specify or limit the scope of this invention.

BRIEF DESCRIPTION OF THE DRAWINGS

FIG. 1 is an explanatory drawing; the abscissa axis corresponds to the length of the lead screw and the ordinate axis corresponds to the mechanical accuracy error of the lead screw.

FIG. 2(A) is an explanatory drawing; the abscissa axis corresponds to the count transfer quantity, and the ordinate axis corresponds to the count error.

FIG. 2(B) is an explanatory drawing.

DESCRIPTION OF THE PREFERRED EMBODIMENTS OF THE INVENTION

Figure 5:
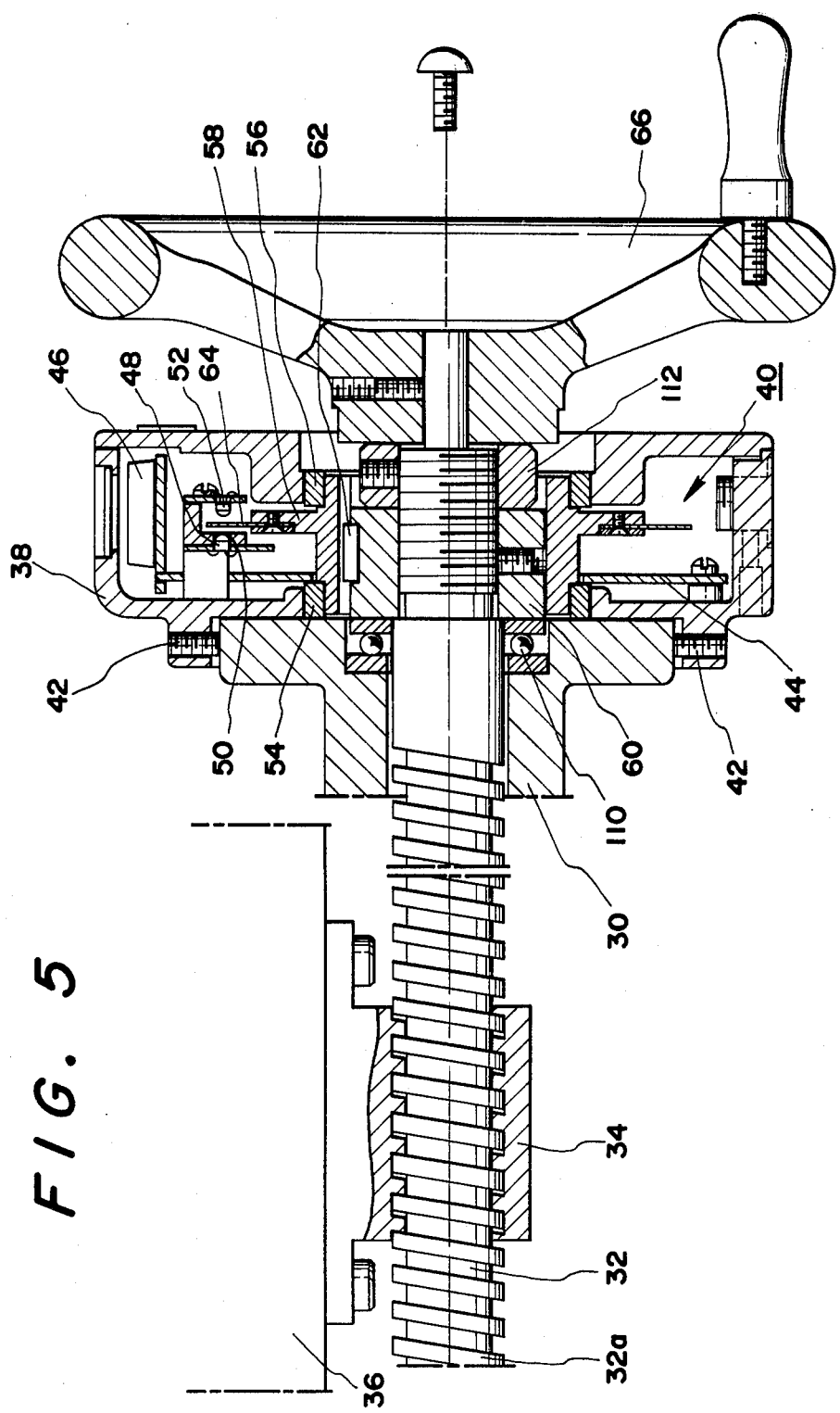
FIG. 5 is a cross-section of the encoder.

In FIG. 5, reference numeral (30) denotes a bearing member provided on the machine body of the machine tool; a lead screw (32) is rotatably mounted on the bearing member (30). Reference numeral (34) denotes a nut member engaged with a screw portion (32a) of the lead screw (32); the nut member (34) is fixed to a cross slide (36). The screw portion (32a) and the nut member (34) constitute the feed system of the machine tool. Reference numeral (38) denotes a casing; an encoder (40) is built in the casing (38). The casing (38) is detachably fixed to a flange portion of the bearing member (30) by means of an adjusting screw (42). Reference numeral (44) denotes a plate member fixed to the casing (38); a digital display unit (46) is fixed to the plate member (44); the display portion of the display unit (46) is positioned immediately below a window formed on the casing (38). Reference numeral (48) denotes a light receiving element consisting of two phototransistors disposed in the casing (38); a known stationary slit plate (50) is disposed in front of the light receiving element (48). Reference numeral (52) denotes a light emitting element consisting of two light emitting diodes disposed on the plate member that is fixed to the casing (38); the light emitting element (52) and the light receiving element (48) are opposed at a predetermined interval. Reference numerals (54) and (56) denote annular bushings fitted and fixed to holes of the casing (38); the outer peripheral surfaces of a rotating body (58) are rotatably fitted to the inner peripheral surfaces of the bushings (54) and (56). A keyway is formed on the inner peripheral surface of the rotating body (58) along its axial direction; a key (62) projected on the outer peripheral surface of a collar (60) is fitted to the keyway. The collar (60) is fixed to the lead screw (32) by means of a screw. Reference numeral (64) denotes a known annular slit plate fixed to the flange portion of the rotating body (58); the slit plate (64) is positioned in the middle between the light receiving element (48) and the light emitting element (52). The foregoing construction constitutes the encoder (40); the light emitting element (52), and the light receiving element (48), the slit plate (64) and the stationary slit plate (50) constitute the pulse generating unit of the encoder (40). Reference numeral (66) denotes a handle fixed detachably to one end of the lead screw (32).

Figure 4:
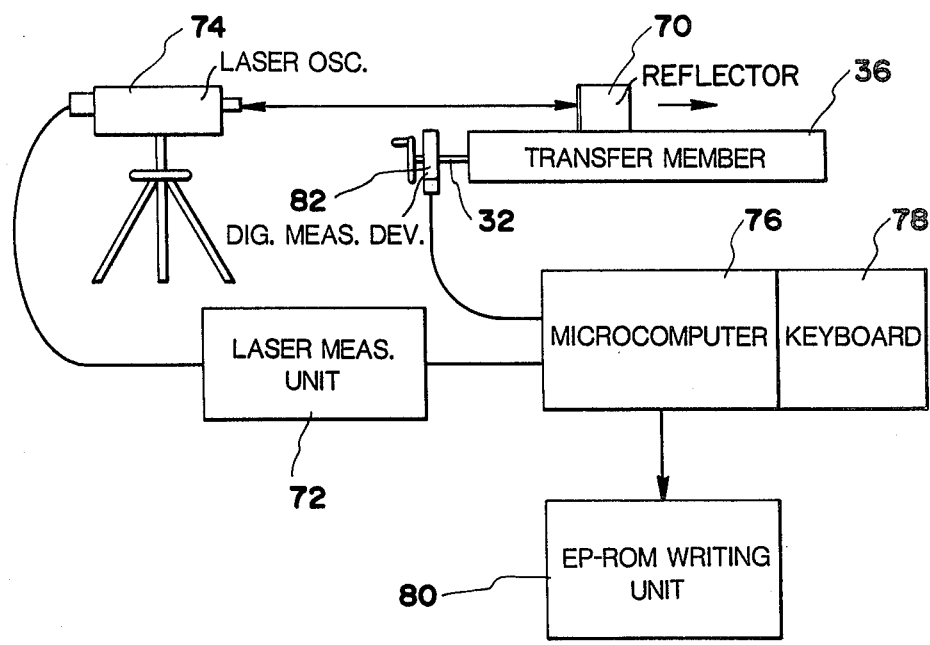
FIG. 4 is a block explanatory drawing showing the condition of writing the accurate transfer data on the EP-ROM.

FIG. 4 shows the device for producing the data written into the EP-ROM (fixed memory for reading only) to be described hereinafter (refer to FIG. 6), and in the drawing, reference numeral (36) denotes a transfer member of the machine tool; when the lead screw (32) is rotated in the clockwise and counterclockwise direction, the transfer member (36) is guided by a guide unit (not shown) to transfer linearly in the right and left directions in the drawing. On the transfer member (36), a reflector (70) is mounted. Reference numeral (82) denotes a digital measuring device including the encoder (40) mounted on the bearing member (refer to (30) in FIG. 5) of the lead screw (32); the rotating body of the encoder (40) is connected to the lead screw (32). Reference numeral (72) denotes a known laser measuring unit using a laser oscillator (74) whose output terminal and an output terminal of the pulse count circuit of the encoder (40) are inputted to an operational circuit of a microcomputer (76). Reference numeral (78) denotes a keyboard of the microcomputer (76), and (80) denotes a writing unit for EP-ROM.

Figure 6:
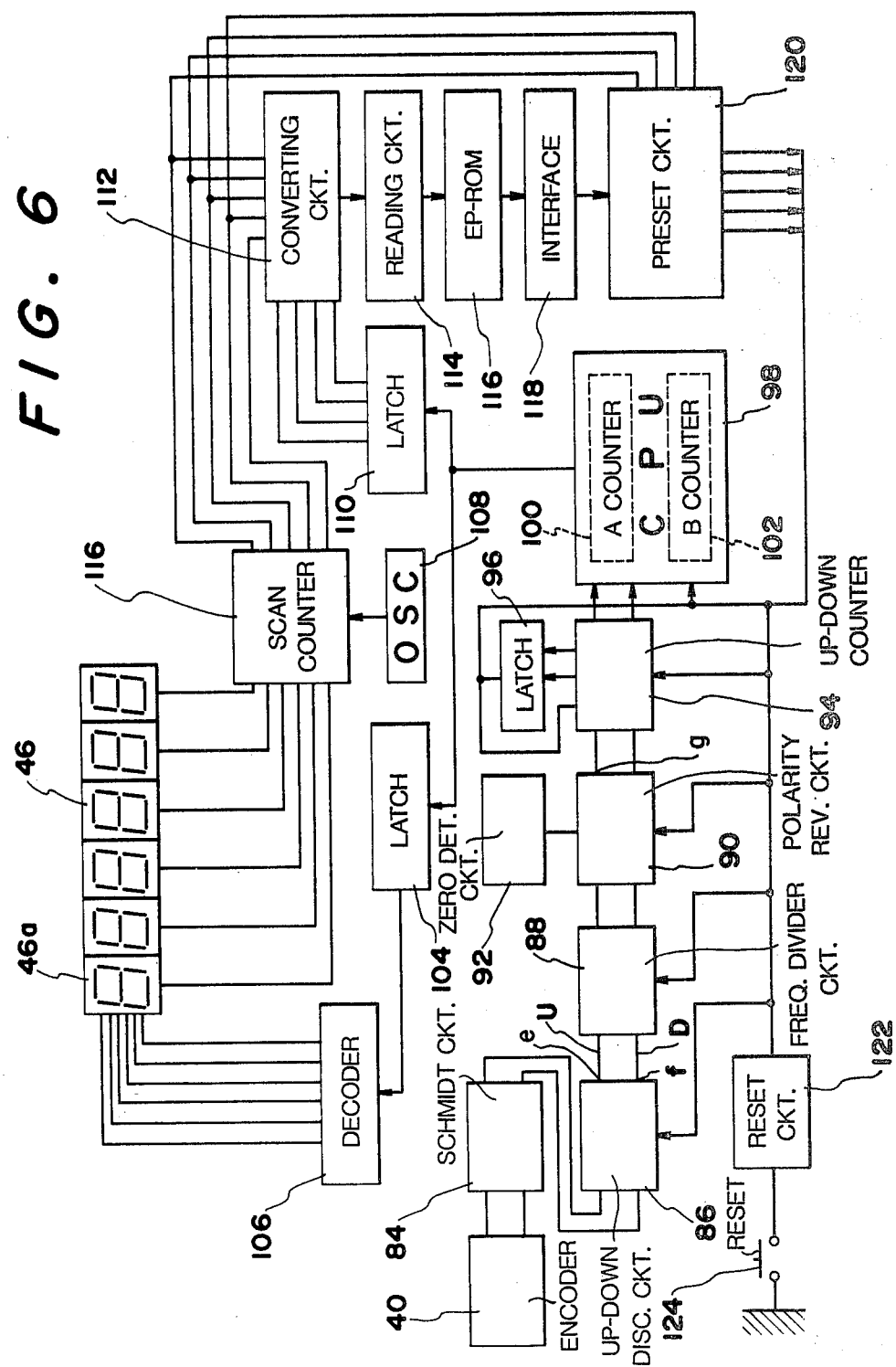
FIG. 6 is an electronic circuit block diagram.

FIG. 6 shows an electronic circuit block diagram of this device. In the drawing, reference numeral (40) denotes an encoder; the light receiving element (48) corresponds to the output terminal thereof. Reference numeral (84) denotes a schmidt circuit; (86) an up-down count discriminating circuit, and the circuit (86) determines the output pulse directional component, namely, the shift of the phase of the pulse of the schmidt circuit (84), and determines the supply of the output pulses of the schmidt circuit 84 either to the up-count line (U) or to the down-count line (D) on the basis of the result of the determination. The discriminating circuit (86) is constructed in such a way that in case the direction of the output pulses of the encoder (40) is in the positive direction, the pulses appear at the terminal (e) of the up-down count discriminating circuit (86) and in case the direction of the output pulse of the pulse generating unit (82) is in the reversing direction, the pulse appears at the terminal (f) of the discriminating circuit (86). Reference numeral (92) denotes a zero detecting circuit; in case an A counter (100) in a CPU (98) is set to zero, this fact is detected by the zero detecting circuit. Reference numeral (88) denotes a frequency dividing circuit; (90) denotes a polarity reversing circuit which performs the operation of reversing the up-down relationship of the pulses to be supplied to a 3-digit updown counter (94) on the basis of the detecting circuit (92). Reference numeral (96) denotes a latch circuit; (98) denotes a CPU, namely, a central processing unit, the A counter (100) of the CPU counts the pulses of the encoder (40) in the clockwise and counter clockwise directions and a B counter (102) performs the processing of A-∈n-R$_4$ to be described hereinafter. Moreover, the register in the CPU (98) performs the operation of A-∈n to be described hereinafter, and other registers perform the setting of R$_4$ to be described hereinafter.

Reference numeral (104) denotes a 7-digit latch circuit; (106) denotes 7-segment decoder; (108) denotes a pulse oscillator; (110) denotes 7-digit latch circuit; (112) denotes a dynamic/static converting circuit; (114) denotes a memory reading circuit; (116) denotes an EP-ROM, namely, a data erasable memory for reading only. Reference numeral (118) denotes a memory interface circuit; (120) denotes a preset circuit; (122) denotes an all reset circuit; (124) denotes a reset switch; the aforementioned elements all being mounted in the casing (38). The display unit (46) is constructed by 6 7-segment display units. The foregoing circuits, (84), (86), (88), (90) and the counters (94), (100) constitute the pulse count circuit of the encoder. The electronic circuit is housed as the integrated circuit in the casing (38).

The operation of the foregoing embodiment of this invention will be described in the following.

In the first place, the operation of writing the accurate transfer data in the EP-ROM (116) is described by referring to FIG. 4.

Firstly, the casing (38) of the encoder (40) is mounted on the lead screw (32) of the machine tool.

The operation is described by referring to FIG. 5, wherein the already installed unit, for example, the dial type display unit is removed from the lead screw (32) of the machine tool, and then the collar (60) is inserted on the lead screw (32) by means of the ball bearing (110), and the collar (60) is fixed by the screw and the nut (112). Next, the casing (38) is brought to the lead screw (32), and the keyway of the center portion of the rotating body (58) is fitted to the key (62) of the collar (60). Next, the adjusting screw (42) is tightened for fixing the casing (38) to the flange portion of the bearing member (30), and moreover the handle 66 is fixed to the lead screw (32).

The output terminal of the pulse count circuit of the encoder, namely, the output terminal of the A counter (100) is connected to the input terminal (A) of the microcomputer (76) that is separately prepared, and the output terminal of the laser measuring unit (72) is connected to the input terminal (B) of the microcomputer (76). The handle (66) is rotated and the transfer member (36) is set at a first origin point, and then, the reset switch (124) is pressed, and all the electronic circuits of the digital measuring unit (82) of this invention are reset to zero. The R$_4$ to be described hereinafter is set to zero. The counter of the output terminal of the laser measuring unit (72) is reset to zero. The handle (66) is rotated manually in the clockwise direction, and the lead screw (32) is rotated and the slit plate (64) is rotated and the pulse waves whose phases are shifted mutually by 90° are generated. The pulse output is shaped by the schmidt circuit (84). The pulse signals are converted to the pulse signals suitable for the counter input signals through the up-down discriminating circuit (86), the frequency dividing circuit (88) and the polarity reversing circuit (90), and are inputted to the up-down counter (94), and are counted by the up-down counter (94). This count data (A) is inputted to the operation circuit of the microcomputer (76). On the other hand, the transfer member (36) is shifted, for example, in the direction of the arrow in FIG. 4 by the rotation of the handle (66), and this transfer quantity is converted to the accurate pulse count data (B) by the laser measuring unit (72), and the pulse count data (B) is inputted to the input terminal (B) of the operational circuit of the microcomputer (76). The microcomputer (76) sections the total length of transfer of the transfer member to an optional pitch on the basis of the output signal of the pulse count circuit of the encoder (40), namely, the count value of the A counter, and the measured error valve (A)-(B) of the A counter (100) for each pitch is computed. Namely, as shown in FIG. 2, the arithmetic operation is carried out such as the error of the count data (A) at the position shifted by the transfer member (36) from the first origin point, for example, 1 mm with the count value of the A counter (100) in the direction of the arrow when the count data (B) is assumed to be $\epsilon_1$ and the error at the position of 2 mm is assumed to be $\epsilon_2$, and the data $\epsilon_n$ is inputted to the writing unit (80) for the EP-ROM together with the address signals for each address signal 1, 2, 3, ..., n by using the count data (A) as the address signals, and the writing of the address signal A and the corresponding $\epsilon_n$ in the EP-ROM (116) by the writing unit (80) for the EP-ROM. By the way and the foregoing microcomputer (76) is a separate computer from the microcomputer whose main constituting elements are the CPU (98), EP-ROM (116) shown in FIG. 6, but this computer may be utilized in lieu of the microcomputer (76).

Next, the output terminal of the pulse count circuit of the encoder is removed from the input terminal of the microcomputer (76).

Now, the case of displaying the feed quantity of the transfer member (36) on the display unit (46) is described.

The transfer member (36) is set at the first origin point. Then, when the handle is rotated in the clockwise direction, the light receiving element (48) of the encoder (40) outputs the pulse signals having a certain directivity, and these signals are inputted to the up-count terminal of the up-down counter (94) through the schmidt circuit (84), the up-down discriminating circuit (86), the frequency dividing circuit (88) and the polarity reversing circuit (90); the count data (A) of the counter (94) is inputted to the A counter (100) of the CPU (98) through the latch circuit (96). This A counter (100) counts up the output of the counter (94), and the content is outputted as BCD signals. The BCD signals outputted from the A counter (100) are supplied to the dynamic/static converting circuit (112) through the 7-digit latch circuit (110), and are converted to static signals. The output of the converting circuit (112) becomes the address signals n of the EP-ROM. The address signals n are supplied to the memory reading circuit (114), and the address output of the reading circuit (114) is supplied to the EP-ROM (116). The data $\epsilon_n$ of the EP-ROM (116) that is designated by the address signal n is read from the EP-ROM, and is fed to the B counter (102) which is part of the CPU (98) through a memory interface (118) and the preset control circuit (120). The B counter (102) computes $$A - \epsilon_n - R_4 = T \tag{1}$$

on the basis of the content A of the A counter (100) and the read data $\epsilon_n$.

By the way, the $R_4$ value is equal to $A-\epsilon_n$ when the origin point set switch (not shown) from the origin point becomes turned ON, but as described in the foregoing, since all of the circuits are reset by a reset switch (124) when the transfer member (36) is positioned at the origin point at the measuring time, the value of $R_4$ is zero at the present time.

Figure 3:
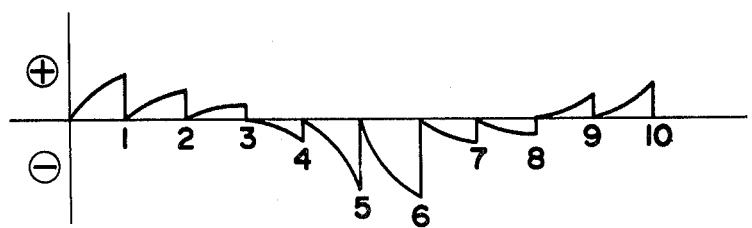
FIG. 3 is an explanatory drawing of the operation of this invention.

The output T of the B counter (102) of the CPU (98) is digitally displayed as a decimal on the display unit (46) through the 7-digit latch circuit (104) and the 7-segment decoder (106). The display of this display unit (46) has the characteristics shown in FIG. 3. Namely, when the transfer member (36) is shifted to the position corresponding to the address 1, the count value of the A counter (100) of the CPU (98) at this time has the error of $\epsilon_1$ as shown in FIG. 2. Accordingly, when the output of the A counter (100) is displayed on the display unit (46) as it is, the display unit (46) is compelled to display the feed data of the transfer member (36) having the error $\epsilon_1$.

However, in this device, since the computation of the formula (1) is carried out in the B counter (102), the display error of the display unit (46) is corrected for zero at the position of the transfer member (36) corresponding to the address 1, and this corrected value is shown on the display unit (46).

By the way, when the transfer member (36) is stopped at the optional position and the origin point set switch (not shown) is turned ON at this position, the A-$\epsilon_n$ value up to this position is set as the $R_4$ value by the software which has been previously programmed in the CPU (98).

Accordingly, when the origin point set switch is turned ON, the display of the display unit (46) can be set for the zero at an optional position of the transfer member (36). By the way, when the rotating quantity of the handle (66) is in the plus region from the origin point that is set optionally, the polarity display unit (46a) of the display unit (46) shows "+". When the handle (66) is rotated in the plus region, the output pulse of the schmidt circuit (84) is discriminated by the up-down discriminating circuit (86) and the output pulse of the schmidt circuit (84) appears at the count down line, and the pulse appearing at the down-count line is transmitted to the down-count terminal of the counter (94) through the frequency dividing circuit (88) and the polarity reversing circuit (90), the content of the counter (94) is sequentially decreased. When the display unit (46) is set for the zero by pressing the origin point set switch (not shown), and then the lead screw (32) is rotated in the counterclockwise direction, the polarity discriminating function of the CPU (98) operates, and the polarity signal from the CPU (98) is transmitted to the display unit (46), and "−" is displayed on the polarity display unit (46a) of the display unit (46). By the way, in the plus region of the first origin point, the zero detecting circuit (92) is not capable of detecting the zero, and therefore, the polarity reversing circuit (90) does not operate. Accordingly, when the lead screw (32) is rotated in the clockwise direction, the pulse of the schmidt circuit (84) is transmitted to the up-count terminal of the counter (94) by the operation of the discriminating circuit (86), and the rotation of the lead screw (32) is converted in the anticlockwise direction so that the output pulse of the schmidt circuit (84) is inputted to the down-count terminal of the counter (94) by the up-down discriminating function of the up-down discriminating circuit (86).

In the $R_4=0$ condition, when the lead screw (32) is rotated in the counterclockwise direction from the plus region and the transfer member (36) is made to reach the first origin point, the display on the display unit (46) becomes zero. At this time, the zero detecting circuit (92) detects the zero, and operates the flip-flop circuit of the polarity reversing circuit (90). When the lead screw

(32) is further rotated in the counterclockwise direction by the operation of the polarity reversing circuit (90), the pulse appearing at the output terminal (f) of the up-down discriminating circuit (86) appears at the output terminal (g) of the polarity reversing circuit (90) until the A counter (100) becomes zero, and the pulse appearing at the output terminal (g) is inputted to the up-count terminal of the counter (94). When the pulse is inputted to the up-count terminal of the counter (94), the polarity display unit (46a) of the display unit (46) displays a minus due to the signal from the CPU (98). In the condition where the minus is displayed on the polarity display unit (46a), and when the lead screw (32) is rotated in the clockwise direction, the output pulse of the schmidt circuit (84) appears at the output terminal (e) of the up-down discriminating circuit (86) by the operation of the up-down discriminating circuit (86), and the pulse appearing at the output terminal (e) appears at the output terminal (h) of the polarity reversing circuit (90) due to the reversing operation of the polarity reversing circuit (90), and the pulse appearing at the output terminal (h) is inputted to the down-count terminal of the counter (94).

By the way, a scan counter (116') is comprised of ring counters, and the display of the display unit (46) is made to carry out sequentially at a predetermined speed from right to left directions on the drawing, and moreover, to scan the data of the circuits (112) and (120) with the predetermined order and timing.

Figure 7:
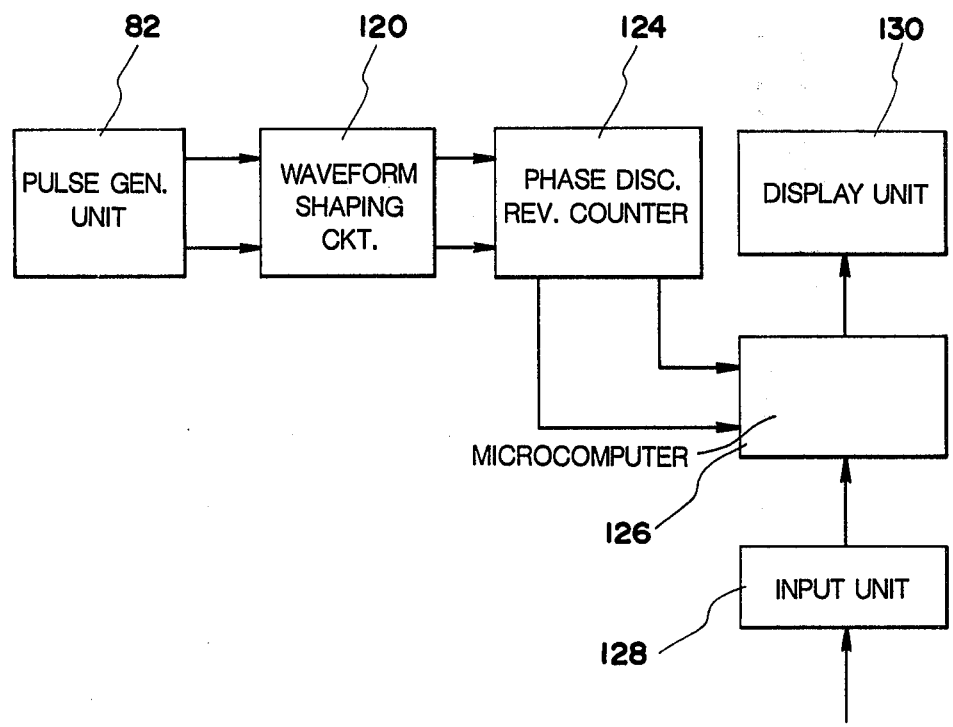
FIG. 7 is an electronic circuit block diagram showing another embodiment.

Another embodiment of this invention will be described in the following by referring to FIG. 7.

Reference numeral (82) denotes a pulse generating unit of the encoder, and concretely speaking, is comprised of the rotating body (58), the slit (64), the light emitting element (52) and the light receiving element (48) shown in FIG. 5. The pulse generating unit (82) outputs the two kinds of pulses whose phases are different by 90° by the rotation of the rotating body (58). When the rotating body is rotated in the clockwise direction, the phase of one of the pulse signals is advanced by 90° as compared with the phase of the other pulse signal, and when the rotating body (58) is rotated in the counter clockwise direction, the phase of one of the pulse signals is delayed by 90° as compared with the phase of the other pulse signal. The advance and delay of the phase indicate the direction of the rotating body (58). Reference numeral (120) denotes a waveform shaping circuit for shaping the output pulse of the pulse generating unit (82).

Reference numeral (124) denotes a phase discriminating reversing counter for discriminating the phase of the output pulse of the waveform shaping circuit (120); when the phase advances by 90°, the output pulse of the waveform shaping circuit (120) is added, and when the phase is delayed, the output pulse of the waveform shaping circuit (120) is subtracted. The output signal of the reversing counter becomes the address signal of the microcomputer (126). The construction of the waveform shaping circuit (120) and the phase discriminating reversing counter (124) corresponds to the construction of pulse count circuit consisting of the schmidt circuit (84), the up-down discriminating circuit (96), the frequency dividing circuit (88), the polarity reversing circuit (90), the up-down counter (94), and the reset circuit (122) and the A counter (100) in FIG. 6. Namely, the pulse generating unit (82), the waveform shaping circuit (120) and the phase discriminating reversing counter (124) constitute the means for converting the quantity of rotational motion of the lead screw of the machine tool and the like.

Reference numeral (126) denotes a microcomputer, and in the EP-ROM of this computer, the measured value of the laser measuring unit whose address signal is the output pulse of the above means is previously written by means of the input unit (128). The writing operation will be described in the following.

In the first place, the encoder (40) is mounted on the lead screw of the machine tool. On the other hand, the output terminal of the laser measuring unit (72) (refer to FIG. 4) is connected to the input terminal of the microcomputer (126) by means of the input unit (128). Next, the cross slide (36) (refer to FIG. 4) is set at the origin point, and the reversing counter (124) of the encoder (40) and the counter (not shown) of the laser measuring unit (72) are reset to the zero. Next, the handle is rotated manually, and the lead screw (32) is rotated and the transfer member (36) is shifted in the direction of the arrow from the origin point and rotated. The rotational motion of the lead screw (32) is converted in A-D mode by the light receiving element of the encoder (40), and the pulse shaped by the waveform shaping circuit (120) is counted by the reversing counter (124), and the count data is inputted to the EP-ROM of the microcomputer (126) as the address signal. On the other hand, the quantity of transfer of the transfer member (36) in the direction of the arrow is converted to the accurate pulse digital signal by the laser measuring unit (72), and the pulse digital signal together with the address signal are written into the EP-ROM of the microcomputer (126) by means of an input unit (128). Namely, the output of the pulse count circuit of the encoder (40) is inputted as the address signal to the EP-ROM of the microcomputer (126) and the address signal corresponds to the super precision measured data by the laser measuring unit (72). After the completion of the writing of the measured data to the microcomputer, the laser measuring unit (72) is removed from the microcomputer, and the laser measuring unit (72) is used for other purpose. Namely, once the accurate transfer measured data of the transfer member (36) together with the address signal are written into the EP-ROM of the microcomputer, the laser measuring unit or other expensive super precision measuring unit becomes unnecessary for this device of this invention.

After the laser measuring unit (72) is removed from the microcomputer, in case the quantity of transfer of the transfer member (36) is measured, the transfer member (36) is positioned at the origin point in the first place, the phase discriminating reversing counter (124) is reset to zero in this condition. Next, the handle is operated to rotate the lead screw (32) and the transfer member (36) is shifted, whereby the counter (124) counts digitally the quantity of transfer of the transfer member (36) from the origin point. The count value of the counter (124) is inputted to the microcomputer (126), and the accurate transfer quantity measured data corresponding to the address signal is called out from the EP-ROM of the microcomputer (126), and is displayed digitally on the display unit (130). According to this embodiment, the accuracy of the displayed value of the display unit (130) is improved drastically.

In case of the digital display in the digital measuring unit, for the reading of the precise transfer quantity of the cross slide, namely, the transfer member (36) and the display of the present position of the cross slide, such digital display is suitable, but it is not suitable for the visual display such as how far the cross slide is separated from the position to which the cross slide is to be located. Particularly, in the condition where the cross slide can be moved to the target position by turning the lead screw, for example, ⅔ of one rotation, in the digital display, this condition cannot be visually displayed clearly. As the result, it is not suitable for the manipulation by rapidly rotating the lead screw roughly by ⅔ of one rotation by hand, and the operator cannot perform the speedy operation as he is required to perform the rotating manipulation of the lead screw while watching the digital display. Under the circumstances, in the following embodiment, the device of this invention is simply mounted on the lead screw of the general machine tool, and the quantity of rotation of the lead screw is measured and is displayed digitally, and the quantity of rotation of the lead screw is also displayed as the analog quantity.

Figure 8:
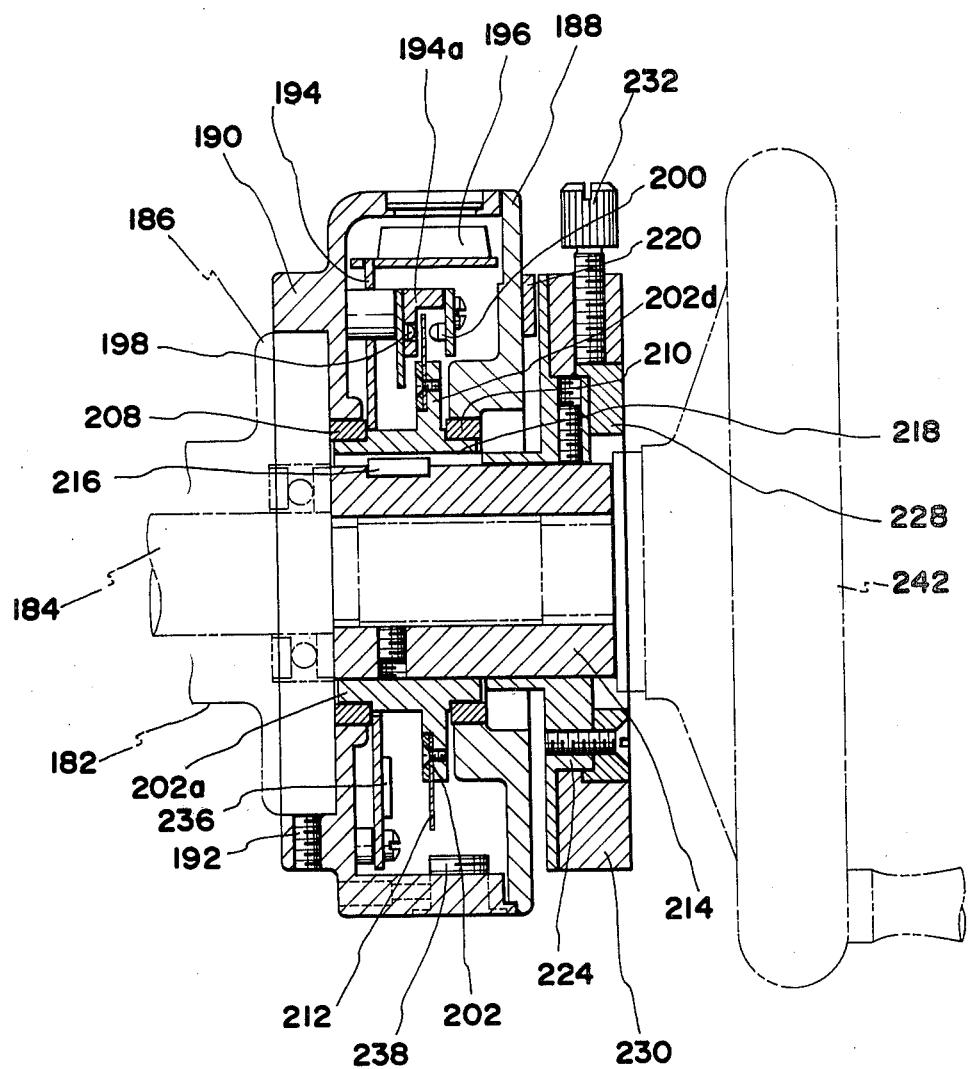
FIG. 8 is a cross-section showing another embodiment of the encoder.
Figure 9:
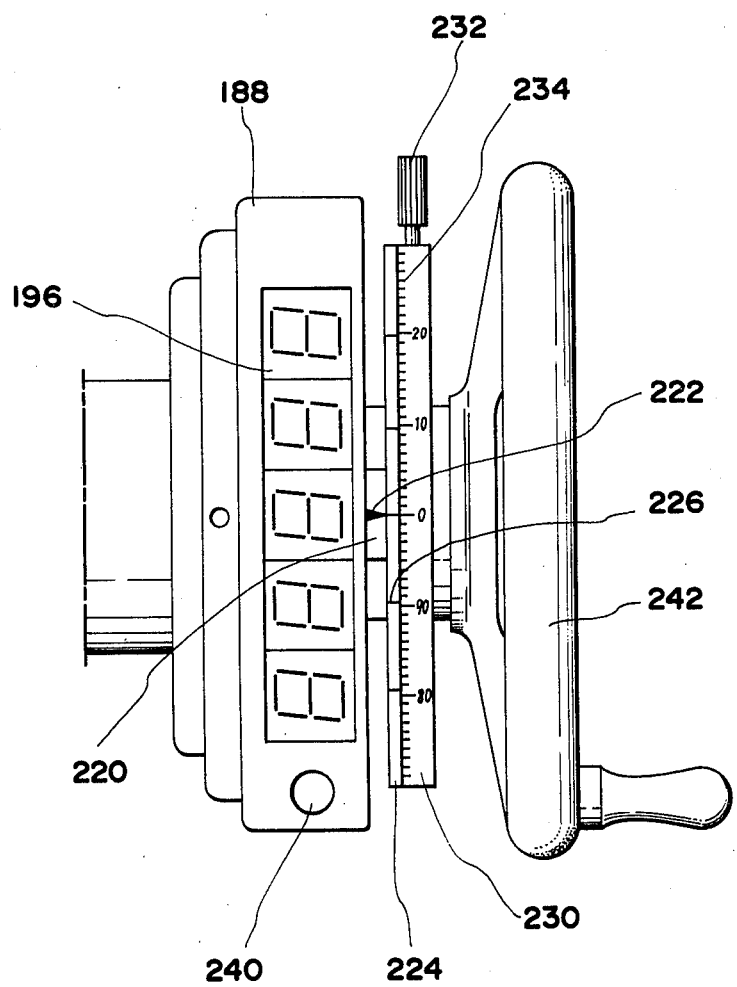
FIG. 9 is a plan of the encoder.

In FIGS. 8 and 9, reference numeral (182) denotes a shaft holder fixed to the machine tool proper, and a shaft portion of a lead screw (184) is rotatably supported on the shaft holder. In case of the general machine tool, an index is provided on a flange portion (186) of the shaft holder (182), and a dial disc is fitted to the lead screw (184), and the rotating quantity of the lead screw (184) is displayed by the index of the flange portion (186) and the graduation of the dial disc. In this embodiment, the dial disc is removed and a casing (188) is loosely fitted to the shaft portion of the lead screw (184) in lieu of the dial disc. The inner peripheral surface of a projection formed in tube form on the casing (188) is fitted to the outer peripheral surface of the flange portion (186), and the casing (188) is fixed to the shaft holder (182) by clamping adjusting screws (192) disposed in a plurality of threaded holes formed on the projection (190). Reference numeral (194) denotes a plate member fixed to the casing (188), and a base plate of a digital display unit (196) is fixed to the plate member (194), and the display portion of the display unit (196) is positioned immediately below a window formed on the casing (188).

Reference numeral (198) denotes two light receiving elements (only one piece is shown) disposed on a plate member (194a), and (200) denotes two light emitting elements (only one piece is shown) disposed on the plate member fixed to the member (194a), and both elements are provided with lenses. The light emitting elements (200) and the light receiving elements (198) are opposed at a predetermined interval. The light emitting elements and the light receiving elements (198) constitute the encoder static unit. Reference numeral (202) denotes a rotating body, and a flange portion (202d) is formed on the outer peripheral surface of the tube portion (202a) of the rotating body (202). The outer peripheral surface of the rotating body (202) is rotatably fitted to the inner peripheral surfaces of the annular bearing members (208), (210) fitted to the holes formed on the center of both side walls of the casing (188). One end surface of the bearing member (208) abuts on the perpendicular surface of the tube portion (202a), and one end surface of the bearing member (210) abuts on the perpendicular surface of the tube portion (202a). Reference numeral (212) denotes an annular slit plate (encoder movable portion) fixed to the flange portion (202d) of the rotating body (202), and the slit plate (212) is positioned at a middle of the light receiving element (198) and the light emitting element (200). A collar (214) is fixed to the shaft portion of the lead screw (184), and a key (216) is fixed to the outer peripheral surface of the collar (214) in its axial direction. On the inner peripheral surface of the tube portion (202a) of the rotating body, a keyway (218) is formed in its axial direction, and the keyway (218) is fitted to the key (216). Reference numeral (220) denotes a member formed with an index (222) on its peripheral surface, and is bonded to one side surface of the casing (188). Reference numeral (224) denotes a dial disc, and the tube portion of the dial disc (224) is fitted to the outer peripheral surface of the collar (214), and is fixed detachably to the outer peripheral surface of the collar (214) by the screw. A graduation (226) is formed on the outer peripheral surface of the dial disc (224). Reference numeral (228) denotes an annular member made of steel material, and is detachably fixed to the side surface of the dial disc (224) by means of the screw. Reference numeral (230) denotes a movable dial disc made of aluminum, and the inner peripheral surface of the shaft hole is fitted to the outer peripheral surface of the thick wall portion of the dial disc (224) and the outer peripheral surface of the annular member (228), and also, abuts on one side surface of the dial disc (224). The dial disc (230) is detachably fixed to the outer peripheral surface of the annular member (228) by means of a screw lever (232). On the outer peripheral surface of the dial disc (230), a graduation (234) is engraved. The centers of the outer circumferences of the collar (214), and dial discs (224), (230), are coincided, Each peripheral surface of the member (220), and the dial discs (224), (230) is set on the identical peripheral surface. Reference numeral (236) denotes a case mounted on the plate member (194), and an integrated circuit is built in the case, and the integrated circuit constitutes a pulse information processing circuit. Reference numeral (238) denotes a power source supply connector, and (240) denotes a reset button, and (242) denotes a handle fixed detachably to one end of the lead screw.

Next, the operation of the embodiment of this invention will be described in the following.

In order to set the device of this invention on the general machine tool of the dial display type, the handle (242) and the nut which are already installed and removed from the lead screw (184), and then the installed dial disc is removed from the shaft portion of the lead screw (184). Next, the collar (214) is fixed to the lead screw (184) by means of the screw. The tube portion (202a) of the rotating body (202) is inserted to the shaft portion of the lead screw (184), and the key (216) is fitted to the keyway (218), and the side surface of the casing (198) abuts on the side end surface of the flange portion (186) of the holder (182). Next, the adjusting screw (192) is clamped against the threaded hole, and the casing (188) is fixed to the flange portion (186). Next, the dial disc (224) is inserted to the collar (214), and the end surface of the tube portion of the disc (224) is pressure contacted on the end surface of the tube portion (202a) of the rotating body (202), and thereafter, the disc (224) is fixed to the collar (214) by means of the screw. Then, the shaft hole of the dial disc (230) is fitted to the disc (224), and then the annular member (228) is fixed to the disc (224). Thereafter, the dial disc (230) is rotatably adjusted along the peripheral surface of the annular member (228), and the dial disc (230) is fixed to the outer peripheral surface of the annular member (228) by the screw lever (232).

Next, the handle (242) is mounted on the lead screw (184). In the foregoing construction, when the handle (242) is turned, and the lead screw (184) is rotated, the rotating body (202) is rotated along the inner peripheral surfaces of the bearing members (208), (210), and the slit plate (212), namely, the encoder movable portion is rotated by interlocking with the rotations of the rotating member (202). When the slit plate (212) is rotated, the light receiving element (198) outputs the pulse and this pulse signal is computed by the integrated circuit in the casing (236), and the rotating quantity of the lead shaft (184) from the reset position, namely, the feed quantity of the transfer member is displayed in decimal value on the display unit of the 7-segment system of the display unit (196). On the other hand, the discs (224), (230) are rotated by interlocking with the rotation of the lead screw (184), and the graduations (226), (234) display in an analog fashion the feed quantity of the transfer member.

The foregoing embodiment shows the feed quantity of the transfer member by the rotation of the lead screw in both digital and analog modes, whereby the manual rotation control of the lead screw can be performed extremely efficiently and accurately which are effects of this invention.

Figure 10:
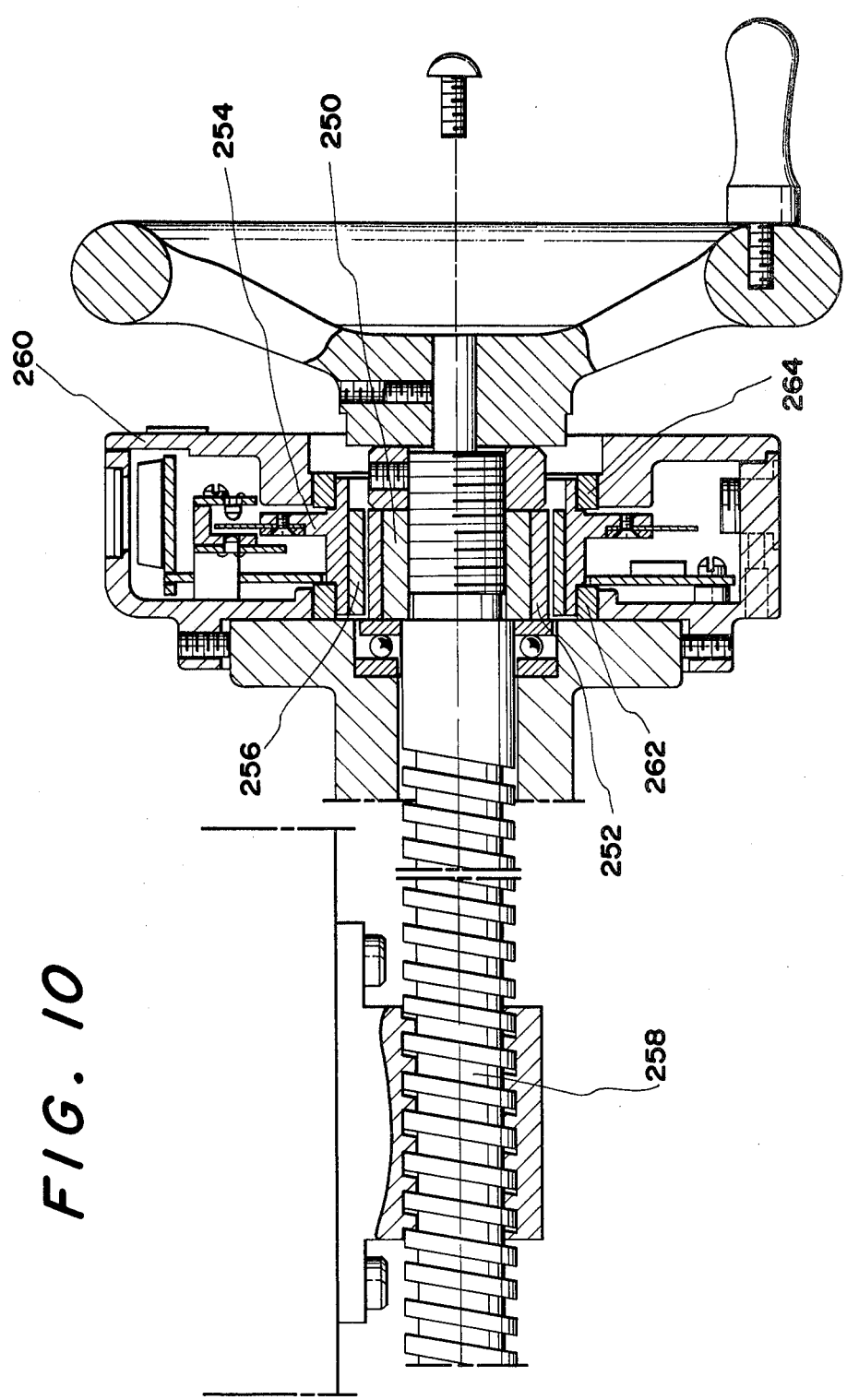
FIG. 10 is a cross-section showing another embodiment of the encoder.
Figure 11:
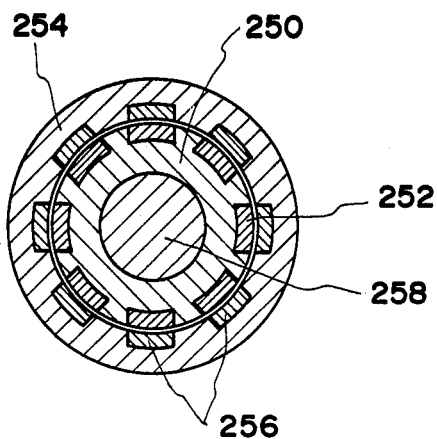
FIG. 11 is a cross-section of the center portion of the encoder.
Figure 12:
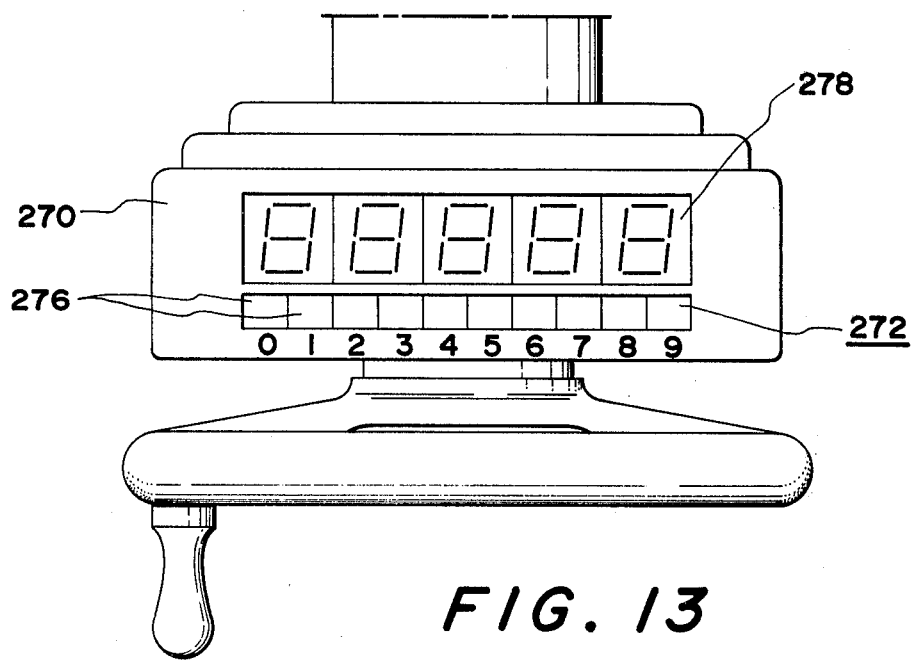
FIG. 12 is a plan showing another embodiment of the encoder.

Next, another embodiment of the structure wherein the lead screw and the rotating body are connected to be interlocked in the rotating direction will be described by referring to FIGS. 10 and 11.

Reference numeral (250) denotes a collar, and a groove is formed on the outer peripheral surface of the collar in its axial direction, and a magnet (252) is fixed in the groove. The magnetic polarity exposed surface of the magnet (252) is set on the surface identical with the outer peripheral surface of the collar (250). Reference (254) denotes a rotating body, and a plurality of grooves are formed on the inner peripheral surface of the rotating body in its axial direction, and a magnet (256) is fixed in the groove. The polarity exposed surface of the magnet (256) is set on the surface identical with the inner peripheral surface of the rotating body (254). The heteropolar surfaces of the magnets (256), (252) are opposed mutually at a predetermined interval as shown in FIG. 11. The outer peripheral surface of the rotating body (254) is fitted rotatably with the inner peripheral surface of the bearing members (262), (264) fixed to the casing (260). The transfer of the rotating body (254) in the direction along its center axis of the rotation is controlled by the end surfaces of the bearing members (262), (264). Other structures are similar to FIG. 5, and the description is omitted.

In the foregoing construction, the lead screws (258), (254) are interlocked by the attractive magnetic force working between the magnets (252), (256). Since it is possible to generate the gap between the inner peripheral surface of the rotating body (254) and the outer peripheral surface of the collar (250) fixed to the lead screw (258) by the foregoing construction, even if the center axis line of the rotation of the rotating body (254) and the center axis line of the lead screw (258) do not accurately coincide, there is no chance of causing the twisting force between the rotating body (254) and the bearing members (262), (264) at the casing (260) side, the smooth rotation can be obtained by interlocking the rotating body (254) with the lead screw (258), and accordingly, there is no requirement of high accuracy in the mounting operation of the casing (260) on the machine tool.

Next, another embodiment will be described by referring to FIGS. 12 through 15.

Reference numeral (270) denotes a casing of a pulse generating unit of an encoder, and the construction of the pulse generating unit is identical with one shown in FIG. 5. Reference numeral (272) denotes a display unit for displaying the minimum digit which is provided on the casing (270), and includes 10 micro display units (276) wherein a light emitting element (274) is disposed in each sectioned chamber, said chambers being arranged in a row. The minimum digit display unit (276) is arranged in parallel with the display unit (278). The sectioned chamber has a transparent or detachable translucent display surface (280). The electronic circuit for displaying for counting the output of the pulse generating unit (282) of the encoder and displaying it on the display unit (278) and the display unit (272) will be described by referring to FIG. 14.

In the drawing, reference numeral (282) denotes a pulse generating unit of the encoder, and (284) denotes a schmidt circuit, and (286) denotes an up-down discriminating circuit, and (288) denotes a polarity reversing circuit, and (290) denotes a frequency dividing circuit, and (292) denotes a 6-digit counter, and (294) denotes a zero reversing circuit, and (296) denotes a pulse oscillator, and (298) denotes a frequency dividing circuit, and (300) denotes a scan counter, and (302) denotes a multiplexer, and (304) denotes a 7-segment decoder, and (306) denotes a BCD-demical decoder, and (272) denotes the minimum digit display unit for the display unit, and (278) denotes a display unit, and these units are connected as shown in the drawing.

The operation of the embodiment will be described wherein the transfer quantity of the cross slide on the basis of the rotation of the lead screw shown in FIG. 5 is electrically displayed.

When the lead screw (32) of the machine tool is rotated by the handle (66), the slit plate (64) is rotatably shifted, and two kinds of pulses whose phases are staggered mutually by 90° are outputted from two light receiving elements (48). These pulses shaped by passing through the schmidt circuit (284). These pulses are transmitted to the up-down discriminating circuit (286), and the pulses are multiplied to quadruple. In case the rotating direction of the lead screw (32) is in clockwise direction, a SIN pulse waveform signal appears at the output terminal OA and a COS pulse waveform signal appears at the output terminal OB, and these signals are shaped and appear at the output terminal OE of the circuit (286). When the lead screw (32) is rotated in a counterclockwise direction, the COS pulse waveform signal appears at the output terminal OA and the SIN pulse waveform signal appears at the output terminal OB, and these signals are shaped and appear at the output terminal OF of the circuit (286). Now, the case where the pulse appears at the output terminal OE of the circuit (286) will be described.

The pulse to the outputted from the output terminal OF of the circuit (286) appears at the output terminal OH of the polarity reversing circuit (288), and the pulse appearing at the output terminal OH is supplied to the frequency dividing circuit (290), and the pulse is frequency divided to ¼ by the frequency dividing circuit (290), and is inputted to the up-down terminal of the counter (292). The polarity display unit (278a) of the display unit (278) at this time displays "+", and displays that the rotating quantity of the lead screw (32) is in the region of the clockwise rotation side from the zero. The information other than the minimum digit counted by the counter (292) is displayed by the numerical value of the decimal notation of the display portion of the display unit (278) by the scanning of a scan counter (300) through a multiplexer (302) and a 7-segment decoder (304). Also, the minimum digit of the counter (292) is displayed on the minimum digit display unit (272) by the scanning operation of the scan counter (300) through a decoder (306). The minimum digit data of the counter (292) is supplied to the BCD-decimal decoder (306) through the multiplexer (302), and the output pulse is supplied to one photoreceptor of a micro display unit (276) of the minimum digit display unit (272). When the minimum digit data is zero, the light emitting element of the display unit (276) at the left end emits the light, and if it is 1, the light emitting element of the adjacent display unit (276) emits the light. Since a plurality of micro display units (276) correspond to 0, 1, 2, 3, 4, 5, 6, 7, 8, 9 of the demical sequentially in right direction in the drawing, the minimum digit of the counter (292) can be read extremely clearly by observing which micro display unit (276) among a plurality of the micro display units (276) emits the light. Also, when the center micro display unit (276) only is set to a color different from those of the other display units (276), the reading can be more easily ascertained.

When the lead screw is rotated in counterclockwise direction, the pulse signal is transmitted to the down-count terminal of the counter (292) and the content of the counter (292) is sequentially decreased. When the reset switch button (not shown) is operated to reset to zero and the lead screw is rotated in counterclockwise direction, a "—" is displayed on the polarity display unit (278a) by the operation of the zero reversing circuit (294) and the polarity reversing circuit (288), and the pulse appearing at the output terminals OF of the circuit (286) appears at the output terminal OH of the circuit (288) by the operation of the flip-flop in the polarity reversing circuit (288), and the output pulse is frequency divided to ¼ pulse and is inputted to the upcount terminal of the counter (292). In the condition where the "—" is displayed in the polarity display unit (278a), and when the lead screw is rotated in the clockwise direction, the output pulse of the frequency dividing circuit (291) is inputted to the down-count terminal of the counter (292).

By the way, if the minimum digit is in hexagonal notation, 6 of the micro display units (276) may be so arranged.

Figure 15:
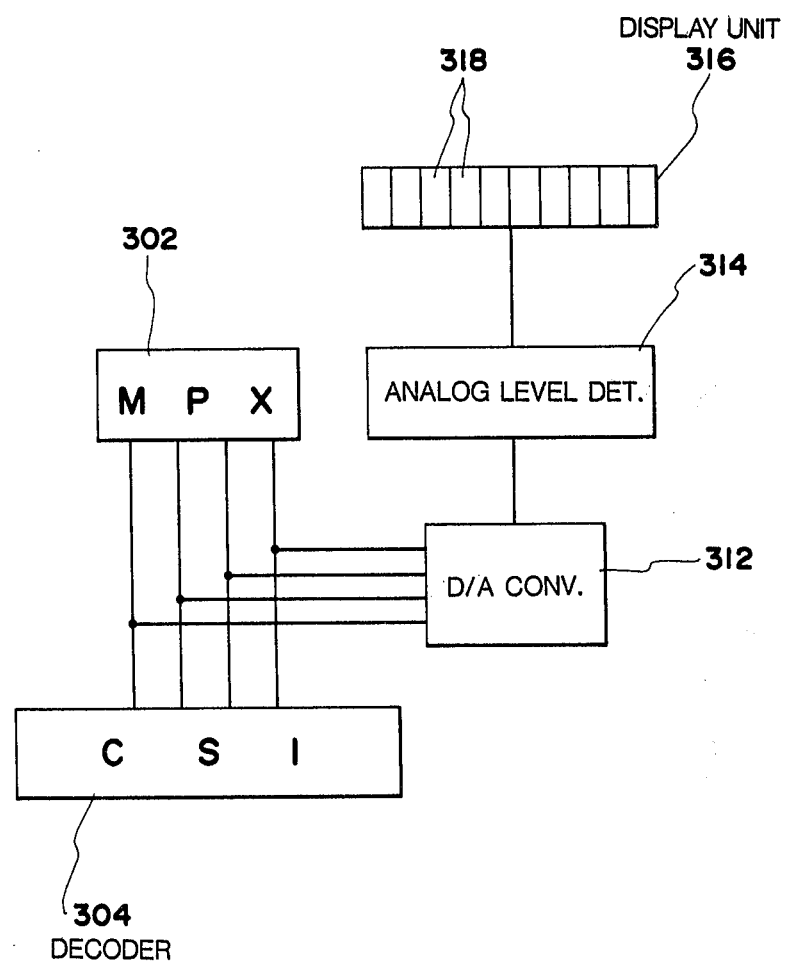
FIG. 15 is an electronic circuit block diagram.

Next, the embodiment in which the minimum digit of the counter is displayed by the continuous analog quantities will be described by referring to FIG. 15.

Figure 13:
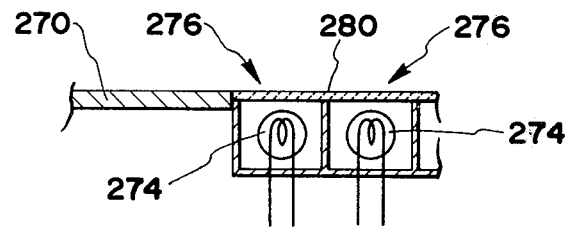
FIG. 13 is a cross-section showing the part of the display unit of the encoder.
Figure 14:
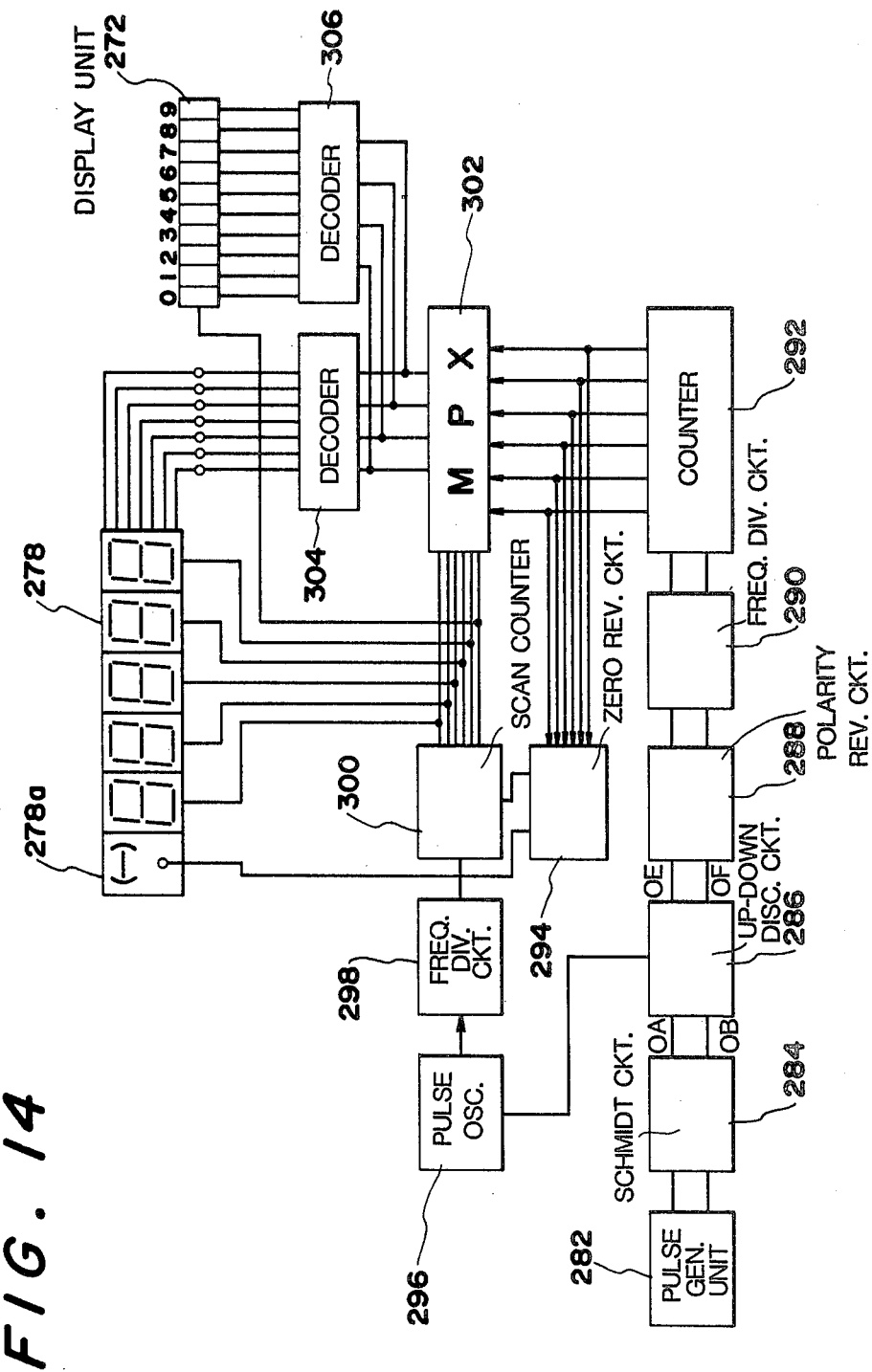
FIG. 14 is an electronic circuit block diagram.

Reference numeral (302) denotes a multiplexer, and (304) denotes a 7-segment decoder, and (312) denotes a D/A converter, and (314) denotes 10 step analog level detector, and (316) denotes a display unit of the minimum digit display unit, and 10 of the micro display units (318) are arranged in a lateral direction, and photoreceptors are provided as shown in FIG. 13 on the 10 display units. Other construction is identical with that of the electronic circuit shown in FIG. 14.

In the foregoing construction, the minimum digit data pulse of the counter (292) is supplied to the D/A converter through the multiplexer (302), and is converted to the voltage signal by the D/A converter, and this voltage signal is detected by the detector (314). The output voltage signal of the detector (314) is supplied to the light emitting element of the display unit (316). At the display unit (316), the light is emitted sequentially and continuously by the photoreceptor of the left end micro display unit (318). Namely, the output voltage of the detector (314) is set for 10 steps, and when the lowest voltage is set, and photoreceptor of the left end micro display unit (318) only emits the light, and when the voltage of the next step is set, the photoreceptor of the left end micro display unit (318) and the next micro display unit (318) emit the light and the micro display unit (318) is selected in correspondence to the voltage levels sequentially as described in the foregoing, and when the voltage is set to the highest level, the photoreceptors of the entire micro display units (318) emit the light. Thus, the minimum digit of the counter is displayed as the analog signal shifting in the right and left directions.

Figure 16:
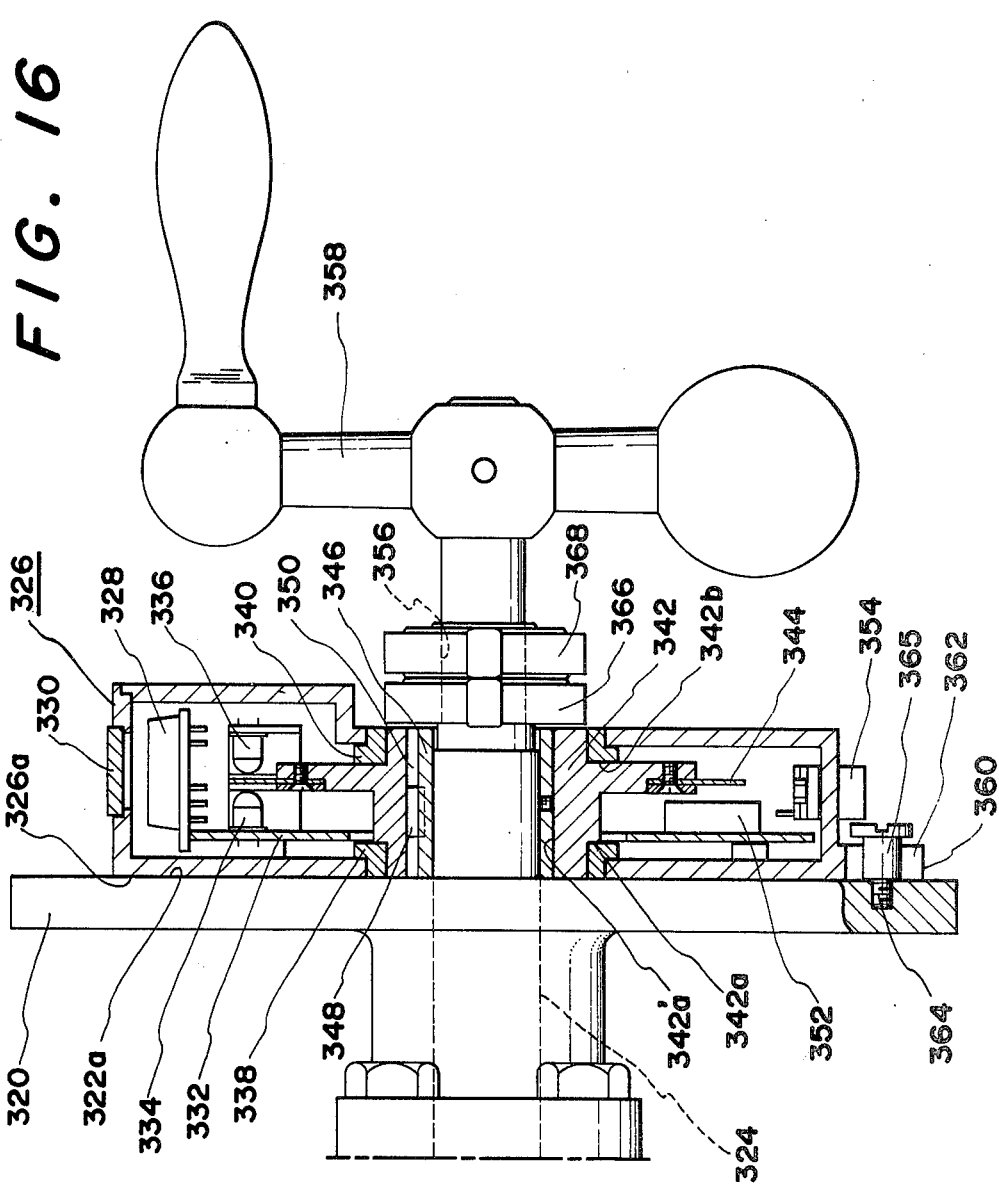
FIG. 16 is a cross-section showing another embodiment of the encoder.
Figure 17:
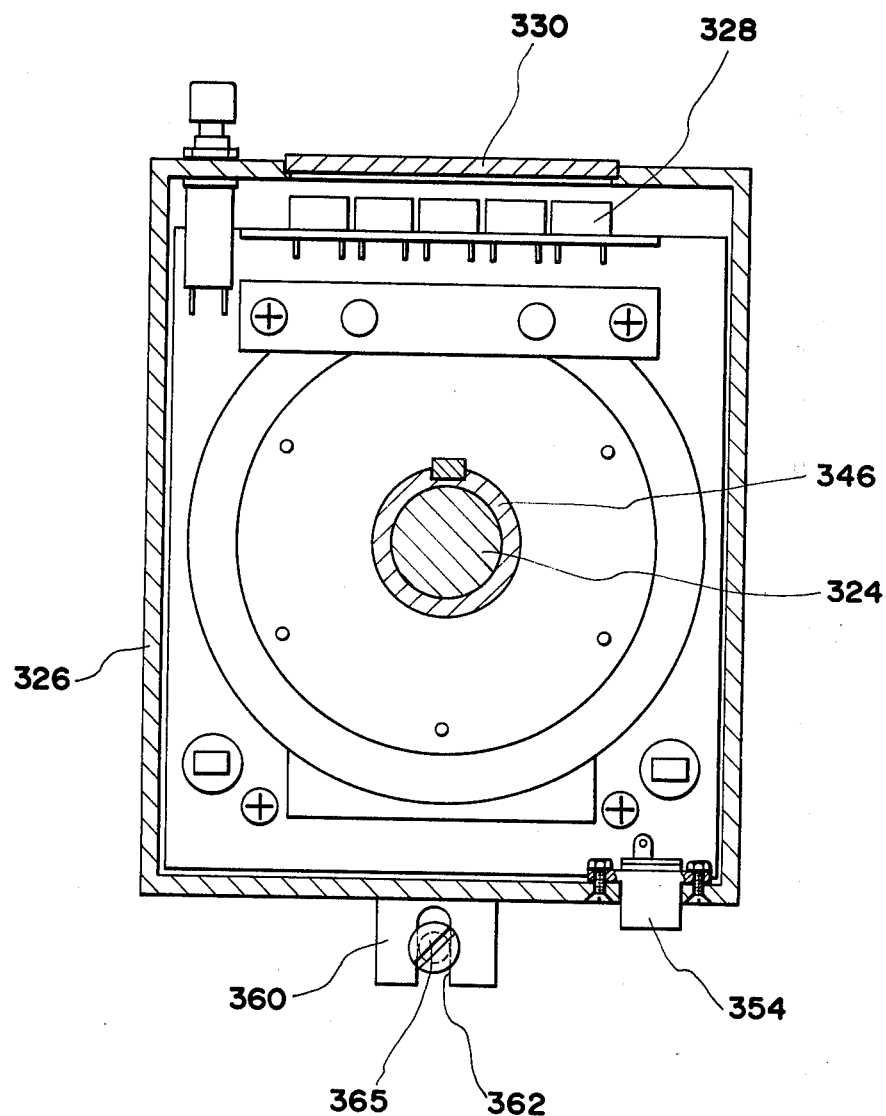
FIG. 17 is a cross-section showing another embodiment of the encoder.

Next, other construction of the pulse generating unit of the encoder will be described by referring to FIGS. 16 and 17.

Reference numeral (320) denotes a shaft holding member of the machine tool, and the shaft portion of the lead screw (324) is rotatably supported by the shaft holding member.

Reference numeral (326) denotes a casing of the encoder, and a plate member (332) is fixed to the inner wall of the casing (326), and a reversible counter (328) is fixed to the plate member (332). The display portion of the counter (328) is positioned immediately below a window (330) formed on a ceiling of the casing (326). Reference numeral (334) denotes two light receiving elements (only one is shown) consisting of phototransistors disposed on the plate member (332) and (336) denotes two pieces of light emitting elements (only one is shown) which are disposed on the member fixed to the member (332), and the light emitting element (336) and the light receiving element (334) are opposed at a predetermined interval. In the front portion of the light receiving element (334), a fixed slit plate (not shown) is disposed. Reference numerals (338) and (340) denote bearing tubes fitted and fixed to circular holes formed in the center of the casing (326), and one side surfaces of the flange portions of the bearing tubes (338) and (340) abut on the inner wall surface of the casing (326). Reference numeral (342) denotes a tubular rotating body, and its outer peripheral surface fits rotatably with the inner peripheral surfaces of the bearing tubes (338) and (340), and the side surfaces (342a) and (342b) of the enlarged diametral portions formed on the rotating body 342 rotatably abut on the end surfaces of the bearing tubes (338) and (340). Reference numeral (344) denotes an annular slit plate fixed to the flange portion of the rotating body (342), and the slit plate (344) is positioned in the middle of the lead screw (324). Reference numeral (346) denotes a collar fitted and fixed to the shaft portion of the lead screw (324), and a key (348) is fixed on its outer peripheral surface in its axial direction. On the inner peripheral surface of the rotating body (342), a keyway (350) is engraved in its axial direction. Reference numeral (352) denotes a case mounted on the plate member (332), and an IC circuit forming the electronic circuits of this device is built in.

Reference numeral (354) denotes a power source supply connector, and (356) denotes a thread portion formed on one end of the lead screw (324), and (358) denotes a handle. Reference numeral (360) denotes a projecting member projected to form a plane identical with a mounting surface (326a) of the casing (326) on the lower portion of the casing (326), and a long groove (362) is formed on the projecting member (360).

Reference numeral (364) denotes a thread hole formed to open to the mounting surface (322a) of the shaft holding member (322). Reference numeral (365) denotes a cap screw and an outside diameter of the shaft portion of the cap screw (365) is set for a degree to be slidably fitted for the long hole (362).

Next, the operation of the embodiment of this invention will be described.

In order to set the encoder on the general machine tool that display the feed quantity of the cross slide in an analog fashion by the rotation of the lead screw (324), the handle (358), the nuts (366) and (368) are removed from the lead screw (324), and then the dial disc (not shown) is removed from the shaft portion of the lead screw (324).

Figure 19:
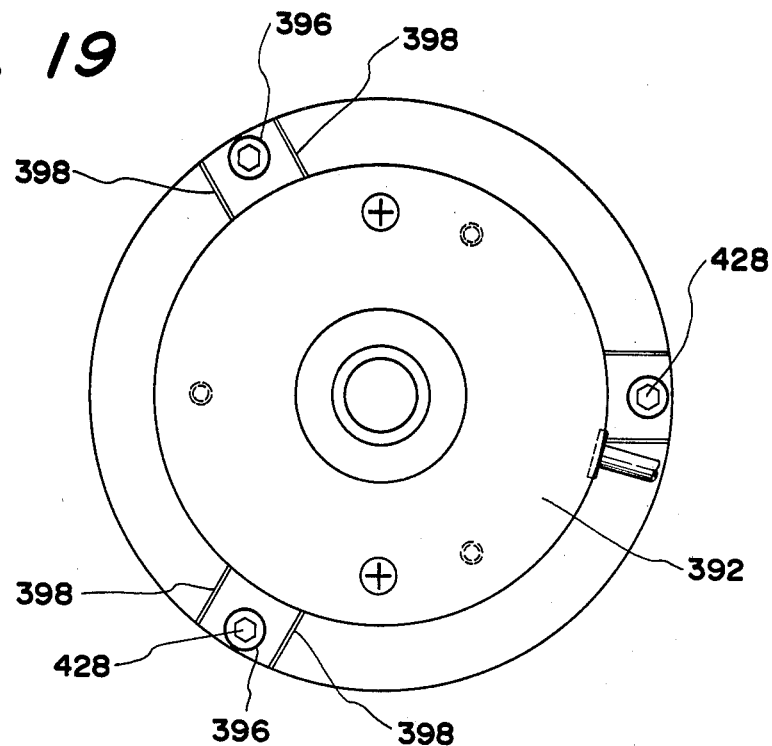
FIG. 19 is a rear view of the encoder.

Next, the collar (356) is fitted and fixed to the lead screw (324) by means of the screw. The casing (326) is brought to the lead screw (324), and the lead screw (324) is inserted to the inner peripheral surface of the rotating body (342), namely, the bearing portion (342a), and the key (348) is fitted to the keyway (350), and the mounting surface of the casing (326) abuts on the mounting surface (322a) of the shaft holding member (322). Next, the casing (326) is rotatably adjusted centering around the lead screw (324), and the long groove (362) is fitted to the thread hole (364). And then, the cap screw (365) is inserted to the long groove (362), and the thread portion is screwed to the thread hole (366). The nut (366) is screwed to the thread portion (356), and the side surface is opposed to the end surface of the rotating body (342) at a certain interval, and the transfer of the casing (326) in the right direction in FIG. 19 is engaged by the side surface of the nut (366). Then, the nut (368) is screwed to the thread portion (356), and the handle (358) is fixed to the lead screw (324). In this condition, the outer peripheral surface of the shaft portion of the cap screw (365) abuts on the wall surfaces of both sides of the long groove (362), and the rotation of the casing (326) centering around the lead screw (324) is prevented. As described in the foregoing, the casing (326) is not fixed to the shaft holding member (322), and simply, the rotation of the casing (362) is stopped by the rotation stop mechanism consisting of the cap screw (365) and the long groove (362) so that the bearing portion (362a) of the encoder is not applied with the eccentric load. In the foregoing construction, when the lead screw (324) is rotated by the handle (358), the rotating body (362) and the slit plate (344) are rotated, and two kinds of pulses whose phases are shifted mutually by 90°, namely, SIN pulse and COS pulse are outputted from the two light receiving elements (334). These pulses are processed by the IC circuit and reversible counter in the case (352), and the feed quantity of the transfer member by the rotation of the lead screw (324) is digitally displayed on the display unit of the counter.

The embodiment of this invention is constructed as described in the foregoing so that the casing of the encoder is such that the its bearing portion is not applied with the eccentric load and the shaft holding member can be simply mounted which are effects derived from this invention.

Figure 18:
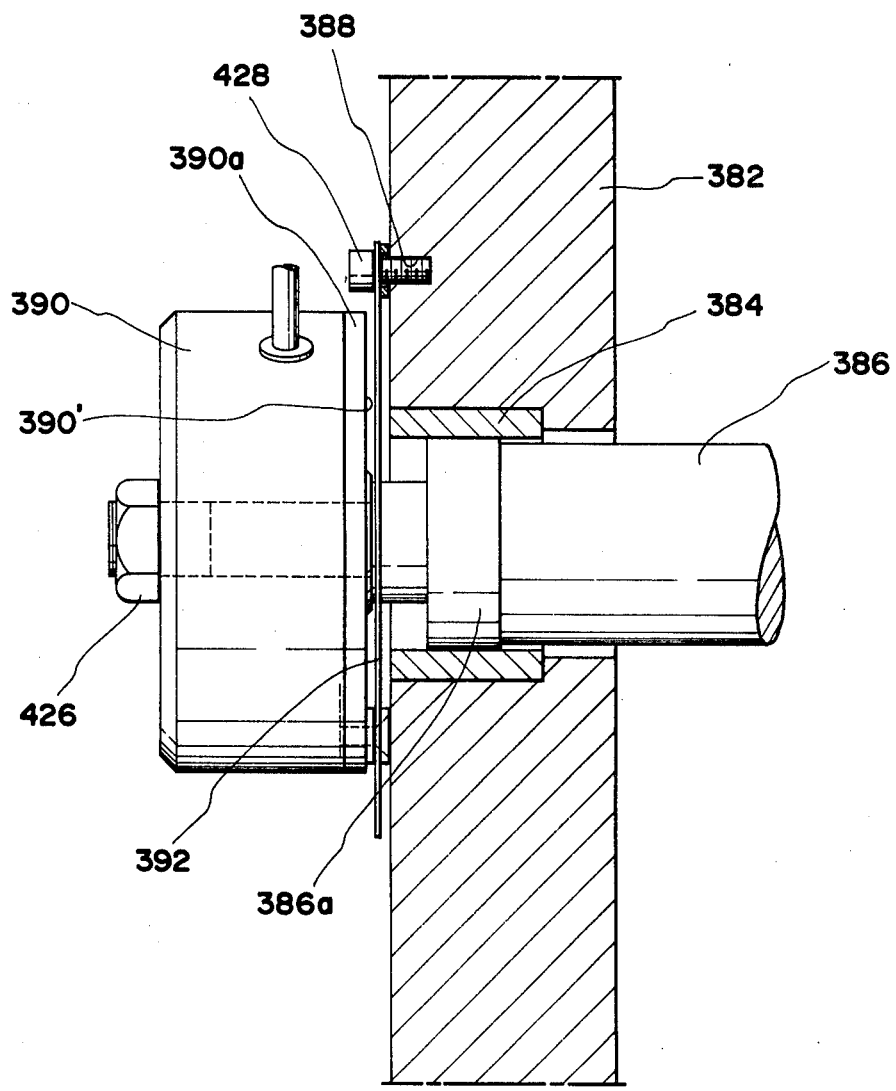
FIG. 18 is a side view showing an embodiment of the casing of the encoder.
Figure 20:
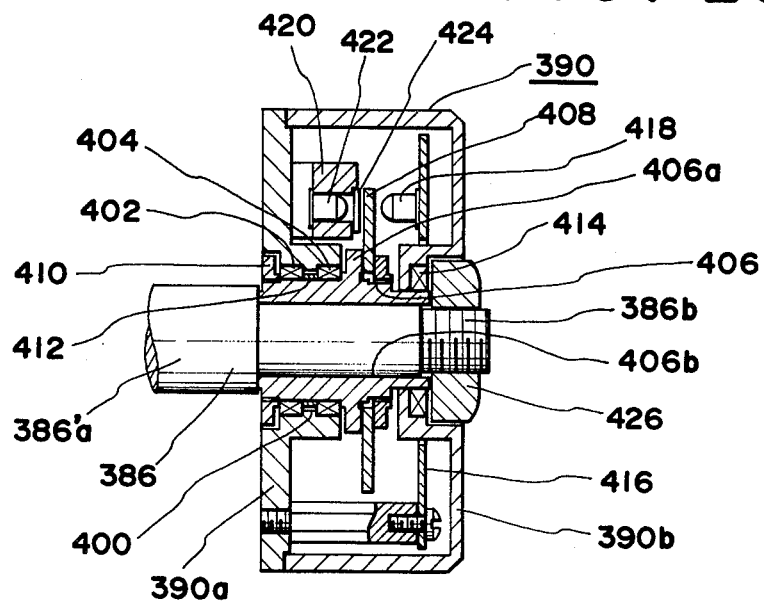
FIG. 20 is a cross-section of the encoder.

Next, another embodiment will be described by referring to FIGS. 18 to 20.

Reference numeral (382) denotes a shaft holding member of the machine tool, and a bearing metal (384) is inserted and fixed to the inner peripheral surface of the hole formed on the shaft holding member, and the outer peripheral surface of the flange portion (386a) of the lead screw (386) of the machine tool is rotatably fitted to the inner peripheral surface of the bearing metal (384). On the mounting surface of the shaft holding member (382), a plurality of thread holes (388) are opened, At one end of the lead screw (386), a thread portion (386b) is formed. Reference numeral (390) denotes a casing of the encoder, and the casing (390) is comprised of a disc member (390a) and a cylindrical member (390b), and the end surface of the open side of the cylindrical member (390b) is fixed to the one surface of the disc member (390a). Reference numeral (392) denote a disc type elastic plate, and the elastic plate (390a) is fixed to the other surface of the disc member (390a) through a spacer by means of the screw. At a plurality of locations on the outer peripheral portion of the elastic plate (392), holes (396) for screwing are formed in correspondence to the thread holes (388), and at both side positions of the holes (396), cut grooves (398) are formed in radial direction. On the inner peripheral surface of the tube portion formed on the center portion of the disc member (390a), the projection (400) is projected, and at both side surfaces of the projection (400), outer rings of ball bearings (402) and (404) are disposed. On the inner peripheral surface of the tube portion, a tubular rotating body (406) is rotatably mounted by means of the ball bearings (402) and (404), and a disc type slit plate (408) is fixed to the flange portion (406a) of the rotating body (406). Reference numeral (410) denotes a nut to be screwed to the thread formed on the outer peripheral portion of the rotating body (406), and the projection of the nut (410) applies the contact pressure against the inner ring of the ball bearing (402), and the contact pressure is transmitted to the inner ring of the ball bearing (404) by means of a retainer (412) disposed in the inner rings of the ball bearings (402) and (404), and the projection of the flange portion (406a) is pressure contacted on the inner ring of the ball bearing (404). On the bottom surface of the casing cylindrical member (390b), a concave portion is formed, and one end of the rotating member (406) is slightly projected from the hole formed in the center of the concave portion. At the innermost portion of the concave portion, an oil seal (414) is disposed. On the outer peripheral portion of the slit plate (408), a slit (not shown) is formed at a predetermined pitch. Reference numeral (416) denotes a plate member fixed to the disc member (390a) by the mounting member, and a light emitting member (418) consisting of light emitting diodes is mounted on the plate member in opposition to the slits. Reference numeral (420) denotes a holder fixed to the disc member (390a), and a pair of light receiving elements (only one is shown) consisting of phototransistors are fixed to the holder, and the light receiving element is opposed to the slit of the slit plate (408). Reference numeral (424) denotes a fixed slit plate fixed to the holder (420), and is disposed in front of the light receiving element (422). On the fixed slit plate (424), the slit of same pitch with the slit of the slit plate (408) is formed, and the brightness and the darkness of the light are produced by the slits on account of the phase differences of 90° of the pair of the light receiving elements (422). The inner peripheral surface of the rotating body (406) constitutes the bearing portion (406b).

Next, the operation of the embodiment of this invention will be described.

In the first place, the casing (390) is brought to the lead screw (386), and the lead screw (386) is inserted to the inner peripheral surface of the rotating body (406), namely, the bearing portion (406b), and one end surface of the rotating body (406) abuts on the side surface of the flange portion (386a') of the lead screw (386). Next, the nut (426) is screwed to the thread portion (386b) of the lead screw (386), and the side surface of the nut (426) is pressure fitted to the end surface of the rotating body (406), and the rotating body (406) is fixed to the lead screw (386). Next, the casing (390) is rotatably adjusted centering around the lead screw (386), and the hole (396) of the elastic plate (392) is made to coincide with the thread hole (388) of the shaft holding member (382). Next, the cap screw (428) is inserted to the hole (396), and the thread portion of the cap screw (428) is screwed to the thread hole (388) by means of a spacer, and the elastic plate (392) is fixed to the mounting surface of the shaft holding member (382). By the way, when the lead screw (386) is provided perpendicularly to the mounting surface of the shaft holding member (382), the mounting surface (390') of the casing (390) is positioned in opposition and parallel with the mounting surface of the shaft holding member (382), but the lead screw (386) is not set perpendicular to the mounting surface of the shaft holding member (382) in many cases. In this case, when the lead screw (386) is inserted to the bearing portion (406b) of the casing (390), the mounting surface (309') of the casing (390) is inclined to the mounting surface of the shaft holding member (382). When this inclination is forcedly corrected in an effort to fix the casing (390) to the shaft holding member (382), the eccentric load is applied to the bearing portion (406b), and the rotating body (406) is unable to rotate smoothly. However, in the embodiment of this invention, as the elastic plate (392) is disposed on the casing (390), the casing (390) can be fixed to the shaft holding member (382) in the condition that its mounting surface (390') is inclined to the mounting surface of the shaft holding member (382). In the foregoing condition, when the lead screw (386) is rotated, this rotation is transmitted to the rotating body (406) and the slit plate (408), pulses whose phases are mutually different by 90° are generated at a pair of the light receiving elements (422) by the rotation of the slit plate (408).

By the way, in the embodiment of this invention, although the cut groove (398) is provided on both sides of the mounting hole (396) of the elastic plate (392), this invention is not particularly limited to this construction, and the projection may be formed at a predetermined location on the outer peripheral portion of the disc type elastic plate and a mounting hole may be formed on the projection, or any construction that produces an elastic action may be employed.

The embodiment of this invention has been described in the foregoing and in case the center axis of the lead screw (386) is not provided perpendicularly to the mounting surface of the shaft holding member (382), the center axis of the bearing portion of the encoder is made to coincide with the center axis of the lead screw (386) whereby the casing (390) can be fixed to the shaft holding member (382). Accordingly, it is possible to prevent the application of the pressure in the distortion direction to the bearing portion in the casing (390), and moreover, it is possible to mount the casing (390) simply on the shaft holding member (382).

What is claimed is:

1. A digital measuring device wherein a transfer quantity of a transfer member is digitally measured by the rotation of a lead screw of the machine, said digital measuring device comprising means for converting a rotational motion quantity of the lead screw to a pulse digital count signal, a microcomputer wherein accurate measured transfer data of said transfer member with said pulse digital count signal being used as an address signal has been previously stored and wherein when said pulse digital count signal is inputted, a digital output signal corresponding to the accurate transfer quantity of said transfer member is outputted on the basis of said previously stored measured transfer data corresponding to said pulse digital count signal, and further comprising a display unit for displaying said digital output signal of said microcomputer.

2. A digital measuring device according to the claim 1, wherein said measured transfer data stored in said microcomputer comprises a deviation value $\epsilon n$ corresponding to a difference between a value A of said pulse digital count signal and a measured value obtained from an external precision measuring unit, and wherein when said value A of said pulse digital count signal is inputted to said microcomputer at a time corresponding to the measuring of said transfer quantity of said transfer member, said microcomputer is arranged to correct said value A of said digital count signal on the basis of said value A of said pulse digital count signal and said deviation value $\epsilon n$ corresponding to said value A, and produces a corrected digital signal corresponding to an accurate transfer quantity of said transfer member and displays said corrected digital signal on said display unit.

3. A digital measuring device according to the claim 1, wherein said measured transfer data stored in said microcomputer comprises a measured value B obtained from an external precision measuring unit, and when a value A of said pulse digital count signal is inputted to said microcomputer at a time corresponding to the measuring of said transfer quantity of the transfer member, said microcomputer is arranged to output said measured value B of said precision length measuring unit which corresponds to said value A by using said value A of said pulse digital count signal as an address signal for accessing data stored in said microcomputer and outputs said measured value B and displays said measured value B on said display unit.

* * * * *